United States Patent
Park et al.

(10) Patent No.: US 7,339,448 B2
(45) Date of Patent: Mar. 4, 2008

(54) WATER RESISTANT ENCODING MATERIAL

(75) Inventors: Edward Hosung Park, Saline, MI (US); Francis Joseph Walker, Tecumseh, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 400 days.

(21) Appl. No.: 11/011,900

(22) Filed: Dec. 14, 2004

(65) Prior Publication Data

US 2006/0124889 A1    Jun. 15, 2006

(51) Int. Cl.
*H01F 3/00* (2006.01)

(52) U.S. Cl. .................... 335/303; 252/62.54

(58) Field of Classification Search ........ 335/302–306; 324/207.25, 259; 252/62.54, 62.56, 62.57
See application file for complete search history.

(56) References Cited

U.S. PATENT DOCUMENTS

| | | | |
|---|---|---|---|
| 5,060,191 A | 10/1991 | Nagasaki et al. | |
| 5,100,754 A | 3/1992 | Yoerger et al. | |
| 5,183,214 A | 2/1993 | Zakheim et al. | |
| 5,996,467 A | 12/1999 | Churgay et al. | |
| 6,340,588 B1 | 1/2002 | Nova et al. | |
| 6,693,441 B2 | 2/2004 | Lane et al. | |
| 2004/0183702 A1* | 9/2004 | Nachtigal et al. | ............. 341/16 |

* cited by examiner

*Primary Examiner*—Ramon M. Barrera
(74) *Attorney, Agent, or Firm*—Ronald W. Wangerow; Harness, Dickey & Pierce, PLC

(57) ABSTRACT

A cured magnetizable admixture of elastomeric thermoplastic, dispersed magnetizable particulate, and optional dispersed hydrophobic material (such as ethylene acrylic monomer rubber or ethylene-vinyl acetate copolymer) provides elastic elongation of not less than about 50 percent at break and water swell of not greater than about 10 percent after curing in magnetizable articles such as target wheels. The magnetizable composition beneficially combines mechanical and durability advantages of traditionally-used thermoset elastomer-based magnetic compounds, under the range of conditions needed for vehicle encoder applications, with the processing and manufacturing advantages of engineered thermoplastics.

17 Claims, 6 Drawing Sheets

WATER RESISTANT ENCODING MATERIAL

This invention relates to magnetizable elastomeric thermoplastics, and to the application of magnetizable elastomeric thermoplastics to making magnetic speed sensor targets (encoders).

Automotive rotational speed sensors have generally been based on principles of magnetic field sensing. Targets for speed sensors, such as magnetic encoders, generally have a magnetizable substance bonded to a structural support ring with alternating magnetic poles established around the circumference of the magnetizable substance. Thermoset elastomers have been used in magnetizable substances as ferrite powder carriers to provide adequate mechanical, dynamic and thermal behavior needed in press-fit conditions common in automotive wheel-speed applications. However, thermoset elastomer-based magnetic compounds are difficult to blend in production-sized rubber compounding equipment due to their high density from the loading level of ferrite. In this regard, production batch volumes weigh two to four times more than standard rubber compound batches, and handling of the material is thereby difficult. Processing of thermoset elastomer-based magnetic compounds also requires relatively expensive equipment, substantial time, and substantial labor to manufacture a fully cured article. In this regard, for instance, nitrile butyl rubber encoders must first be formulated, molded and cured. The molded part, after curing, is then appropriately grooved before the grooved encoder can be subsequently bonded, attached, and/or fastened into its target wheel assembly.

Thermoplastic elastomers are a potential replacement for thermoset rubbers in magnetizable compounds for encoders and certain of these materials are described in U.S. patent application Ser. No. 10/760,662 entitled "MAGNETIZABLE THERMOPLASTIC ELASTOMERS" as filed on Jan. 20, 2004 that sets forth approaches for use of thermoplastic elastomers (TPE materials) in target encoders and is hereby incorporated by reference herein. In this regard, magnetizable thermoplastic elastomer compositions as admixtures of thermoplastic polymer, elastomeric polymer, and magnetizable powder are disclosed and reviewed in the referenced application. However, while defining a basis for use of thermoplastic elastomers in target encoders, U.S. patent application Ser. No. 10/760,662 does not directly address issues of water resistance (and particularly of blistering and swelling of target encoders in response to water exposure). In some applications of encoder target wheels, such an issue is a source of concern. In this regard, swelling can create a non-uniform surface or a blistered surface, and such surface non-idealities frustrate smooth operation of an encoder wheel in the close tolerances needed for measuring rotational speeds in machinery.

Thus, it is desirable to have a magnetizable material that is readily fabricated into a magnetic encoder and that is essentially water resistant while maintaining other desired properties in use of the magnetic encoder.

SUMMARY

The invention provides a magnetizable admixture composition of (a) a continuous phase of elastomeric thermoplastic selected from the group consisting of polyester thermoplastic elastomer, polyamide thermoplastic elastomer, acrylic acid ester rubber/polyacrylate rubber thermoplastic vulcanizate, ethylene acrylic rubber thermoplastic vulcanizate, silicone-thermoplastic vulcanizate, thermoplastic polyurethane vulcanizate, thermoplastic polyurethane vulcanizate/polyamide thermoplastic elastomer, and combinations thereof; and (b) a first dispersed phase of magnetizable particulate dispersed in the continuous phase;

(c) where the composition provides an elastic elongation property of not less than 50 percent at break and a water swell property of not greater than 10 percent in cured magnetizable polymer of the composition; and (d) where the first dispersed phase is dispersed in sufficient quantity in the composition such that a first magnetic field in a first portion in a cured block (a block having a length of about 1 centimeter, a width of about 1 centimeter, and a thickness of about 50 millimeters) of the composition is differentiated from a second magnetic field in a second portion of the block by not less than about 200 Gauss when measured across an air detection gap of about 1 mm.

In one aspect, a second dispersed phase of hydrophobic material selected from the group consisting of ethylene acrylic (monomer) rubber, ethylene-vinyl acetate copolymer, and combinations thereof is dispersed in the continuous phase where the hydrophobic material is in not greater than twice the weight of the elastomeric thermoplastic in the composition.

In another aspect, the magnetizable particulate is from about 80 weight percent to about 90 weight percent of the composition, the elastomeric thermoplastic is polyamide thermoplastic elastomer, and the composition further has a second dispersed phase of hydrophobic material selected from the group consisting of ethylene acrylic (monomer) rubber, ethylene-vinyl acetate copolymer, and combinations thereof dispersed in the continuous phase where the hydrophobic material is in not greater than twice the weight of the elastomeric thermoplastic in the composition.

In yet another aspect, the magnetizable particulate is from about 70 weight percent to about 90 weight percent of the composition and the elastomeric thermoplastic is selected from the group consisting of acrylic acid ester rubber/polyacrylate rubber thermoplastic vulcanizate, ethylene acrylic rubber thermoplastic vulcanizate, silicone-thermoplastic vulcanizate, thermoplastic polyurethane vulcanizate, thermoplastic polyurethane vulcanizate/polyamide thermoplastic elastomer, and combinations thereof; and the composition further has a second dispersed phase of hydrophobic material selected from the group consisting of ethylene acrylic (monomer) rubber, ethylene-vinyl acetate copolymer, and combinations thereof dispersed in the continuous phase where the hydrophobic material is in not greater than twice the weight of the elastomeric thermoplastic in the composition.

In yet another aspect, the composition has about 80 weight percent iron as the magnetizable particulate, about 15 weight percent polyester thermoplastic elastomer, and a second dispersed phase of about 5 weight percent ethylene acrylic (monomer) rubber also dispersed in the continuous elastomeric thermoplastic phase.

In still another aspect, the composition has about 75 weight percent iron as the magnetizable particulate, about 15 weight percent polyester thermoplastic elastomer, and a second dispersed phase of about 10 weight percent ethylene-vinyl acetate copolymer dispersed in the continuous elastomeric thermoplastic phase.

In a further aspect, the invention provides an encoder target wheel made of a continuous ring of cured magnetizable polymer cured from the previously mentioned magnetizable admixtures; the target wheel further has at least one first magnetized portion in the continuous ring (the first magnetized portion having a first magnetic field strength) and at least one second portion in the continuous ring (the second portion having a second magnetic field strength differentiated from the first magnetic field strength by not less than about 200 Gauss when measured across an air detection gap of about 1 mm).

In yet other aspects, a method for making a magnetizable admixture by admixing the components is provided; and a method for making an encoder target wheel is also provided where a continuous ring precursor is formed from the magnetizable admixture, the precursor is cured to form a cured continuous ring, at least one first magnetized portion in the continuous ring is magnetized such the first magnetized portion has a first magnetic field strength as a remanence, and at least one second portion (a second magnetic field strength differentiated from the first magnetic field strength by not less than about 200 Gauss when measured across an air detection gap of about 1 mm) is also magnetized or otherwise enabled in the continuous ring. In one aspect of this, the above process makes an encoder target wheel.

The magnetizable thermoplastic elastomer compositions beneficially combine mechanical and durability advantages of thermoset elastomer-based magnetic compounds, under the range of conditions needed for vehicle encoder applications, with the processing and manufacturing advantages of engineered thermoplastics.

Further areas of applicability will become apparent from the detailed description provided hereinafter. It should be understood that the detailed description and specific examples, while indicating embodiments of the invention, are intended for purposes of illustration only and are not intended to limit the scope of the invention.

Figure 1:
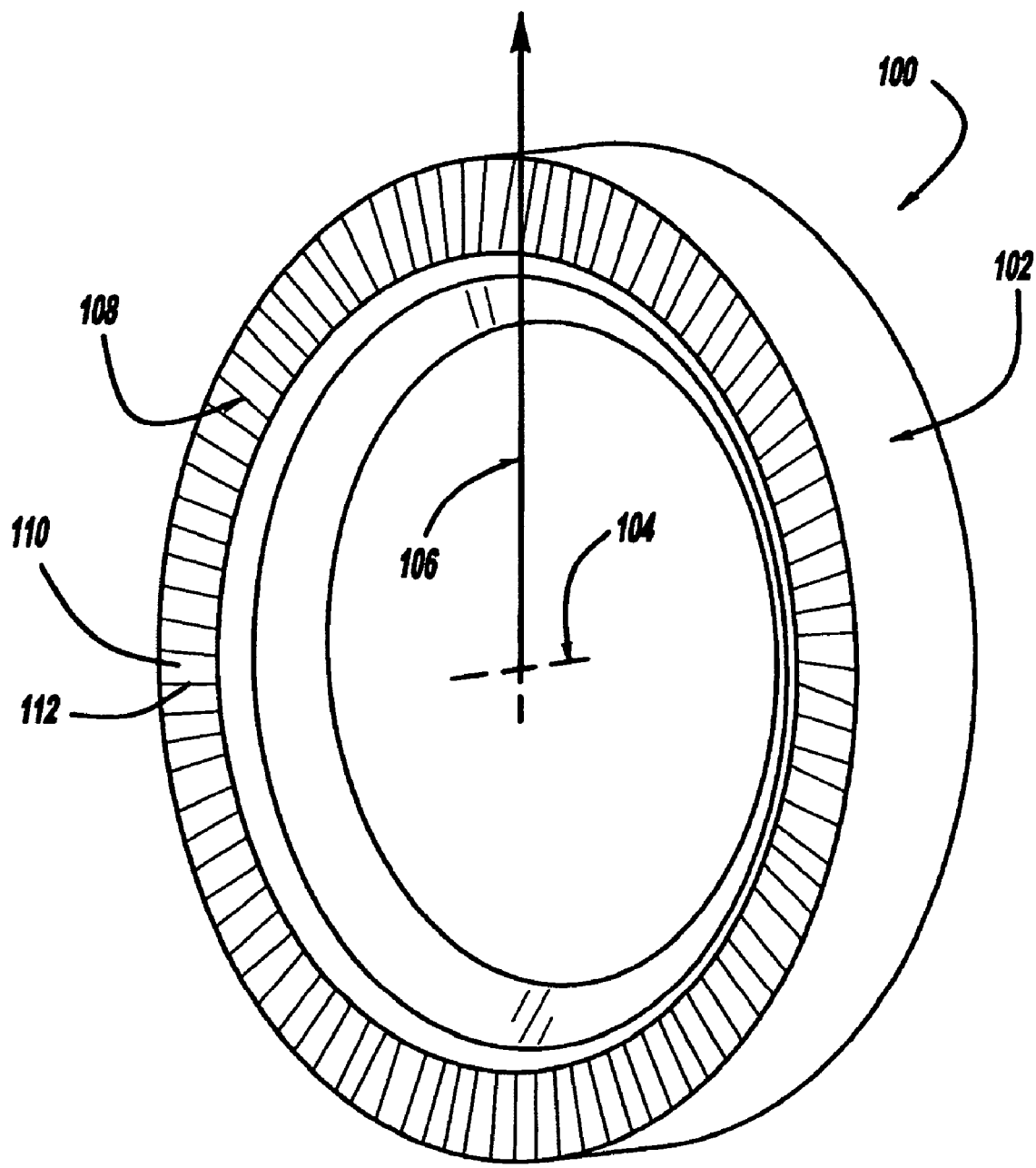
FIG. 1 shows a view of an encoder target wheel assembly with an encoder strip in parallel mounting to the rotational radius of the target wheel.

It should be noted that the figures set forth herein are intended to exemplify the general characteristics of an apparatus, materials and methods among those of this invention, for the purpose of the description of such embodiments herein. These figures may not precisely reflect the characteristics of any given embodiment, and are not necessarily intended to define or limit specific embodiments within the scope of this invention.

DESCRIPTION

The following definitions and non-limiting guidelines must be considered in reviewing the description of this invention set forth herein.

The headings (such as "Introduction" and "Summary") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

Preferred embodiments provide an electrically conductive fluoropolymer material. In this regard, details in polymer materials for use in the embodiments are first discussed.

Carbon-chain-based polymeric materials (polymers) are usefully defined as falling into one of three traditionally separate generic primary categories: thermoset materials (one type of plastic), thermoplastic materials (a second type of plastic), and elastomeric (or rubber-like) materials (elastomeric materials are not generally referenced as being "plastic" insofar as elastomers do not provide the property of a solid "finished" state). An important measurable consideration with respect to these three categories is the concept of a melting point—a point where a solid phase and a liquid phase of a material co-exist. In this regard, a thermoset material essentially cannot be melted after having been "set" or "cured" or "cross-linked". Precursor component(s) to the thermoset plastic material are usually shaped in molten (or essentially liquid) form, but, once the setting process has executed, a melting point essentially does not exist for the material. A thermoplastic plastic material, in contrast, hardens into solid form (with attendant crystal generation), retains its melting point essentially indefinitely, and re-melts (albeit in some cases with a certain amount of degradation in general polymeric quality) after having been formed. An elastomeric (or rubber-like) material does not have a melting point; rather, the elastomer has a glass transition temperature where the polymeric material demonstrates an ability to usefully flow, but without co-existence of a solid phase and a liquid phase at a melting point.

Elastomers are frequently transformed into very robust flexible materials through the process of vulcanization. Depending upon the degree of vulcanization, the glass transition temperature may increase to a value that is too high for any practical attempt at liquefaction of the vulcanizate. Vulcanization implements inter-bonding between elastomer chains to provide an elastomeric material more robust against deformation than a material made from the elastomers in their pre-vulcanized state. In this regard, a measure of performance denoted as a "compression set value" is useful in measuring the degree of vulcanization ("curing", "cross-linking") in the elastomeric material. For the initial elastomer, when the material is in non-vulcanized elastomeric form, a non-vulcanized compression set value is measured according to ASTM D395 Method B and establishes thereby an initial compressive value for the particular elastomer. Under extended vulcanization, the elastomer vulcanizes to a point where its compression set value achieves an essentially constant maximum respective to further vulcanization, and, in so doing, thereby defines a material where a fully vulcanized compression set value for the particular elastomer is measurable. In applications, the elastomer is vulcanized to a compression set value useful for the application.

Augmenting the above-mentioned three general primary categories of thermoset plastic materials, thermoplastic plastic materials, and elastomeric materials are two blended combinations of thermoplastic and elastomers (vulcanizates) generally known as TPEs and TPVs and jointly denoted herein as elastomeric thermoplastics. Thermoplastic elastomer (TPE) and thermoplastic vulcanizate (TPV) materials have been developed to partially combine the desired properties of thermoplastics with the desired properties of elastomers. As such, TPV materials are usually multi-phase admixtures of elastomer (vulcanizate) in thermoplastic. Traditionally, the elastomer (vulcanizate) phase and thermoplastic plastic phase co-exist in phase admixture after solidification of the thermoplastic phase; and the admixture is liquefied by heating the admixture above the melting point of the thermoplastic phase of the TPV. TPE materials are multi-phase mixtures, at the molecular level, of elastomer and thermoplastic and provide thereby block co-polymers of elastomer and thermoplastic. In this regard, TPEs are co-oligomeric block co-polymers derived from polymerization of at least one thermoplastic oligomer and at least one elastomeric oligomer. TPVs and TPEs both have melting points enabled by their respective thermoplastic phase(s).

In one embodiment, elastomeric thermoplastic of any of polyester thermoplastic elastomer, polyamide thermoplastic elastomer, acrylic acid ester rubber/polyacrylate rubber thermoplastic vulcanizate, ethylene acrylic rubber thermoplastic vulcanizate, silicone-thermoplastic vulcanizate, thermoplastic polyurethane vulcanizate, thermoplastic polyurethane vulcanizate/polyamide thermoplastic elastomer, or combinations of these is admixed with magnetizable particulate so that the particulate is dispersed (as a first dispersed phase) into a continuous phase of the elastomeric thermoplastic. In admixing the admixture, the thermoplastic elastomer and magnetizable particulate are proportioned to provide an elastic elongation property of not less than about 50 percent (more preferably 100 percent) at break, a water swell property of not greater than about 10 percent (more preferably 5 percent) in cured magnetizable polymer of the resulting admixture, and a sufficient quantity of particulate so that a first magnetic field in a first portion in a cured 1 cm×1 cm×50 mm block of the composition is differentiated from a second magnetic field in a second portion of the block by not less than about 200 Gauss when measured across an air detection gap of about 1 mm.

The elastic elongation property is determined according to ASTM D-412. The water swell property is determined according to ASTM D-471. The 1 cm×1 cm×50 mm block is representative of the loading needed in an encoder application. Respective to the amount of magnetizable particulate, it is to be appreciated that excessive particulate can either frustrate elongation by rendering cured magnetizable polymer derived from the admixture too brittle or frustrate the ability to selectively magnetize separate portions of the cured 1 cm×1 cm×50 mm block into differentiated remanence by creating an effective continuum of magnetizable material where the individual particles cannot be independently magnetized. However, sufficient particulate must be admixed so that the cured polymer will provide sufficient remanence, after a magnetizing field has been applied to a portion of the cured block, so that a reasonable sensor (positioned within a reasonable distance of the cured portion of the encoder having the remanence) can respond to the higher remanence when the (first) magnetized portion passes by the sensor and also respond to the lower remanence (or lack of magnetic field in one embodiment) when the (second) portion passes by. A differentiation between the (remanence) fields of the first and second portions of about 200 Gauss or greater as measured across an air detection gap of about 1 mm provides such utility.

In various embodiments, by blending certain amounts of desired ingredients, these thermoplastic materials are melt-processed in standard processing equipment, such as injection molders, plastic extruders and blow molders, while maintaining material properties needed for use in magnetic encoders. In one embodiment, such materials are used in magnetic encoders employed under the extreme environmental conditions experienced by automotive vehicles.

In some embodiments, a second dispersed phase of hydrophobic material of ethylene acrylic (monomer) rubber, ethylene-vinyl acetate copolymer, or combinations of these are also dispersed into the elastomeric thermoplastic continuous phase. However, in such embodiments, the hydrophobic material is maintained to be not greater than about twice the weight of the elastomeric thermoplastic of the overall admixture so that elastomeric and structural robustness in use is still achieved.

In one embodiment in this regard, the hydrophobic material is added to make a magnetizable admixture where the magnetizable particulate is from about 80 weight percent to about 90 weight percent of the admixture composition and the elastomeric thermoplastic is polyamide thermoplastic elastomer. In another such embodiment, the hydrophobic material is added to make a magnetizable admixture where the magnetizable particulate is from about 70 weight percent to about 90 weight percent of the admixture composition and the elastomeric thermoplastic is acrylic acid ester rubber/polyacrylate rubber thermoplastic vulcanizate, ethylene acrylic rubber thermoplastic vulcanizate, silicone-thermoplastic vulcanizate, thermoplastic polyurethane vulcanizate, thermoplastic polyurethane vulcanizate/polyamide thermoplastic elastomer, or a combination of these.

In one particular embodiment, the magnetizable admixture is made by admixing about 15 weight percent polyester thermoplastic elastomer, about 80 weight percent iron magnetizable particulate as a first dispersed phase, and about 5 weight percent ethylene acrylic (monomer) rubber as a second dispersed phase. In this regard, however, it is to be noted that the dispersive admixing of a first and second dispersed phase into the general continuous phase of polyester thermoplastic elastomer yields a compositional embodiment of a polyester thermoplastic elastomer with a dispersed phase of ethylene acrylic (monomer) rubber and a dispersed phase of magnetizable particulate throughout both of the polyester thermoplastic elastomer and the dispersed phase of ethylene acrylic (monomer) rubber.

In another particular embodiment, the magnetizable admixture is made by admixing about 15 weight percent polyester thermoplastic elastomer, about 75 weight percent iron magnetizable particulate as a first dispersed phase, and about 10 weight percent ethylene-vinyl acetate copolymer as a second dispersed phase. As in the prior embodiment, the dispersive admixing of a first and second dispersed phase into the general continuous phase of polyester thermoplastic elastomer yields a compositional embodiment of a polyester thermoplastic elastomer with a dispersed phase of ethylene-vinyl acetate copolymer and a dispersed phase of magnetizable particulate throughout both of the polyester thermoplastic elastomer and the dispersed phase of ethylene-vinyl acetate copolymer.

In one embodiment, the admixtures are easily processed, for example, by continuous compounding through twin-screw extrusion, fragmentation into small pellets for ease of handling through cutting, and then fabrication into components using established thermoplastic processing equipment.

Respective to the continuous phase in the admixtures, elastomeric thermoplastics (thermoplastic elastomers or TPE/TPV materials) are a class of polymers in which the end use properties of elastomers and/or vulcanized elastomers are combined with the processing advantages of thermoplastics. These materials are convenient for use with conventional processing techniques, such as milling, injection molding, extrusion, blow molding, and vacuum forming—allowing the production of useful articles having true elastomeric properties without compounding or vulcanization. The thermoplastic material and the cured elastomeric material are present in the magnetizable composition embodiments at levels sufficient to provide the necessary material and strength and durability for the application, while retaining good processability on standard plastics equipment. As should be apparent, the hard magnetic particulate distributes during admixing into all polymeric phases when (a) an elastomeric thermoplastic polymeric phase and a hydrophobic polymeric phase are in the admixture (providing an overall three phase admixture of two polymeric phases and one hard particulate phase) or (b) when a thermoplastic polymeric phase, a dispersed elastomeric and/or vulcanizate polymeric phase, and the hydrophobic polymeric phase are in the admixture (providing an overall four phase admixture of three polymeric phases and one hard particulate phase).

An example of a TPE advantageously employed in the embodiments is Hytrel™ thermoplastic polyester elastomer, sold by Dupont. Examples of thermoset elastomers useful in the embodiments include ethylene acrylic elastomers (AEM), such as Vamac™ G, sold by Dupont. The AEM elastomers are, in some embodiments, used as "solid plasticizers" to toughen, i.e., increase elongation and decrease tensile strength of the TPE compounds, but without sacrificed of heat aging performance. In an alternative embodiment, copolymers of acrylate and cross-linking monomer (ACM) elastomers are employed instead of AEM elastomers to "plasticize" TPE based compounds; examples of ACMs include Nypol™ and Hytemp™ as sold by Zeon and Noxtite™ as sold by Unimatec.

The present compositions comprise magnetizable particulate in the form of powder or fiber, including such powders that are known in the art. In various embodiments, magnetizable powder is selected from the group consisting of magnetizable ferrites (such as strontium-ferrite oxide and barium-ferrite oxide), ferrite alloys (such as those containing aluminum and nickel and cobalt), rare-earth ferrite granulate; and mixtures thereof. An example of a suitable ferrite alloy containing aluminum and nickel and cobalt is Alnico™ (available from MMC Magnetics of Hauppauge, N.Y.).

The multiphase embodiment compositions are relatively heavily loaded with a hard magnetic material type of magnetic powder to provide compositions for forming into encoders and targets for rotational sensors that operate on magnetic principles. In particular, shaped articles produced from the magnetizable composition embodiments are magnetized according to known procedures to produce alternating opposite magnetic poles along a surface of the shaped article.

In a preferred embodiment, the thermoplastic polymeric material used in the embodiments is a thermoplastic elastomer (TPE). As previously noted, thermoplastic elastomers have some physical properties of rubber, such as softness, flexibility and resilience, but are processed in a similar manner to thermoplastics. A transition from a melt to a solid rubber-like composition occurs fairly rapidly upon cooling. The transition is readily reversible upon heating. This is in contrast to conventional elastomers, which harden slowly (and generally irreversibly) upon heating. Thermoplastic elastomers are frequently processed on conventional plastic equipment such as injection molders and extruders. Scrap is generally readily recycled.

Even as the elastomeric thermoplastic provides a continuous phase in the admixture respective to the first dispersed phase of magnetizable particulate and the optional second dispersed phase of hydrophobic material, it is to be appreciated (as previously noted) that thermoplastic elastomers themselves have a multi-phase structure, where the phases are generally intimately mixed at the molecular level and that thermoplastic vulcanizates themselves have a multi-phase structure as a polymeric admixture of distinguished polymeric portions. In many cases, the phases are held together by graft or block copolymerization. At least one phase is made of a material that is hard at room temperature but fluid upon heating. Another phase is a softer material that is rubber like at room temperature. It is common to refer to the hard phase as "crystalline" and to the soft phase as "amorphous". In this regard, therefore, the admixture embodiments are also defined as a continuous phase of thermoplastic, a dispersed phase of either elastomer or vulcanized elastomer, a dispersed phase of magnetizable particulate, and an optional dispersed phase of hydrophobic material where the magnetizable particulate is, after admixing, dispersed throughout all of the continuous phase of thermoplastic, dispersed phase of either elastomer or vulcanized elastomer, and optional dispersed phase of hydrophobic material.

When hydrophobic material and elastomeric thermoplastic material are to be melt-blended, mixing necessarily occurs above the softening or melting point of the higher melting component.

In a preferred embodiment, the magnetizable compositions are incorporated into magnetic encoders, such as those used in the automotive and other industries as targets for magnetic wheel speed sensors. Encoders are produced in one embodiment where a magnetizable composition is over-molded onto a metal case that has been pretreated with adhesive. The over-molding process is accomplished in one embodiment by compression molding; in another embodiment, over-molding is accomplished with an injection molding process. In yet another embodiment, the encoder is made from the compositions in a bi-material molding process, where a thermoplastic (compositionally differentiated from the elastomeric thermoplastic of the magnetizable admixture) is molded as a structural substrate for the magnetizable composition embodiments.

An example of an embodiment application for which the material compositional embodiments is used is a magnetic encoder for a wheel speed measuring system. Such a wheel speed measuring system has particular application in automobiles or in other systems having a need for measuring the speeds of components. In one embodiment, such an encoder is made with a previously described admixture over-molded onto a metal case pretreated with adhesive. Another example approach for making an encoder for the wheel is, as previously generally noted, to mold the admixture in a bi-material molding process, where a thermoplastic (compositionally differentiated from the elastomeric thermoplastic of the magnetizable admixture) is molded as the structural substrate for the magnetizable TPE substance. As also previously generically noted, the over-molding process for the wheel encoder is, in one embodiment, a compression-molding process, and, in an alternative embodiment, an injection-molding process.

Figure 2:
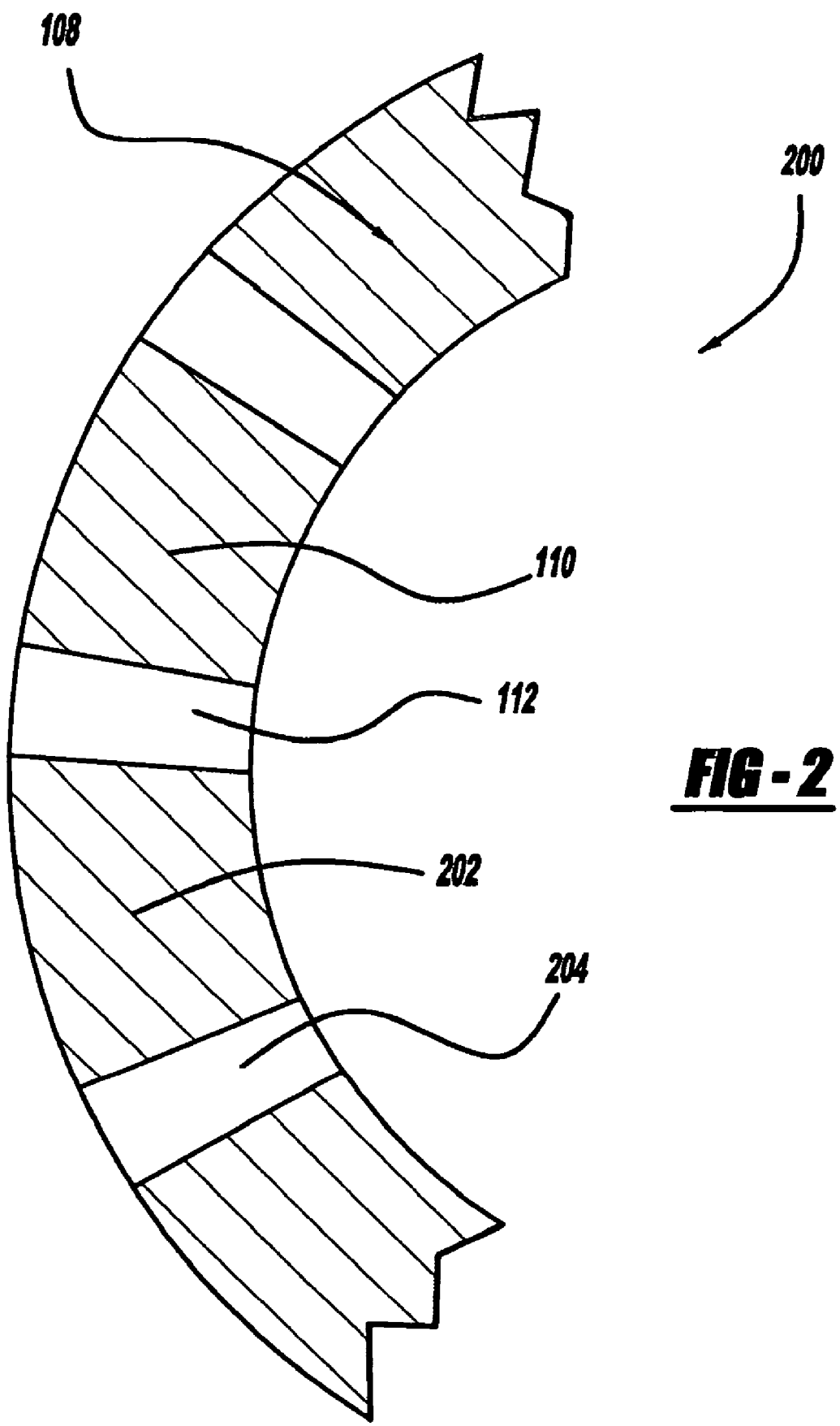
FIG. 2 shows portion detail in the encoder target wheel assembly of FIG. 1.
Figure 3:
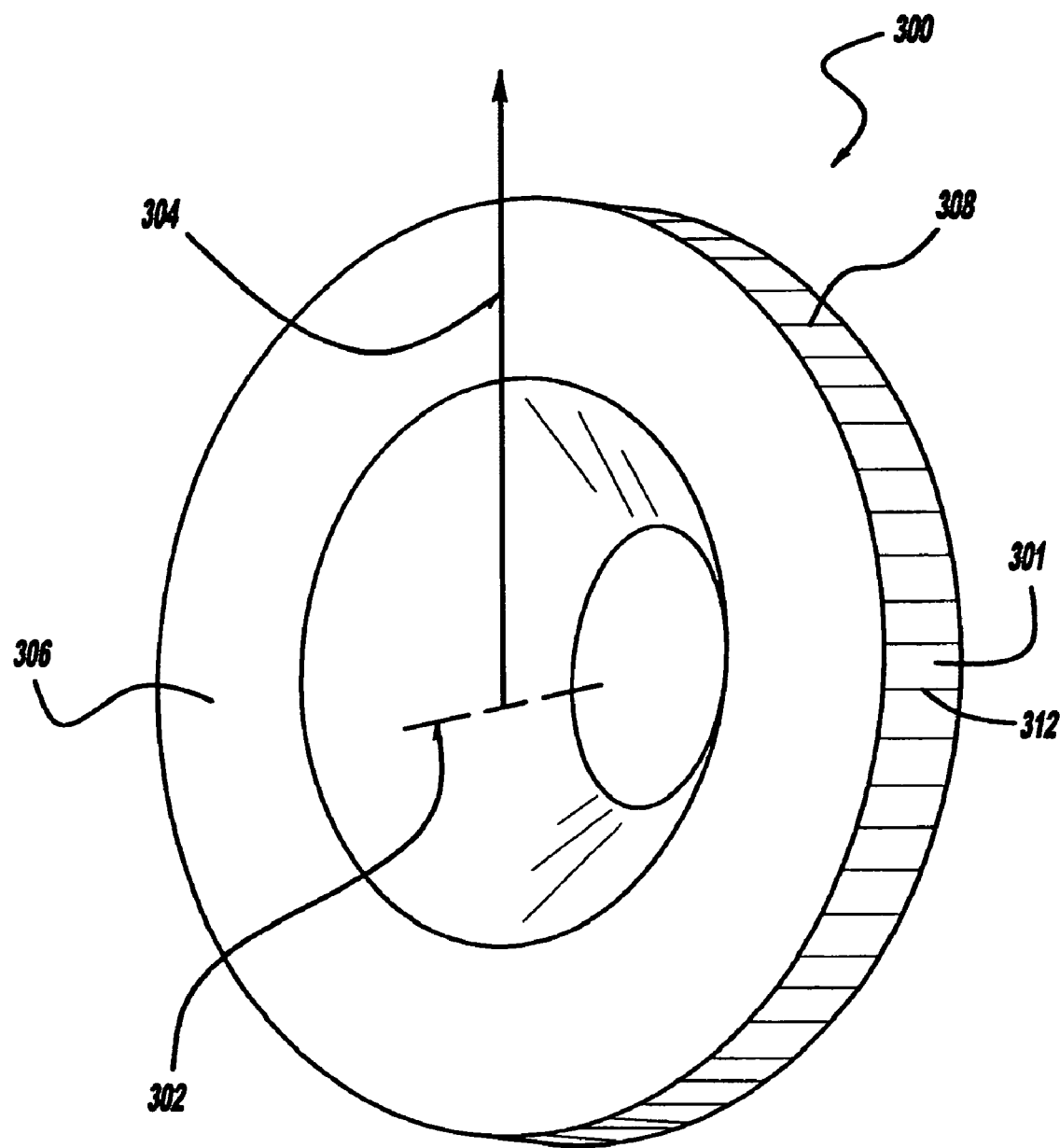
FIG. 3 shows a view of an encoder target wheel assembly with an encoder strip in perpendicular mounting to the rotational radius of the target wheel on the circumference of the target wheel.
Figure 4:
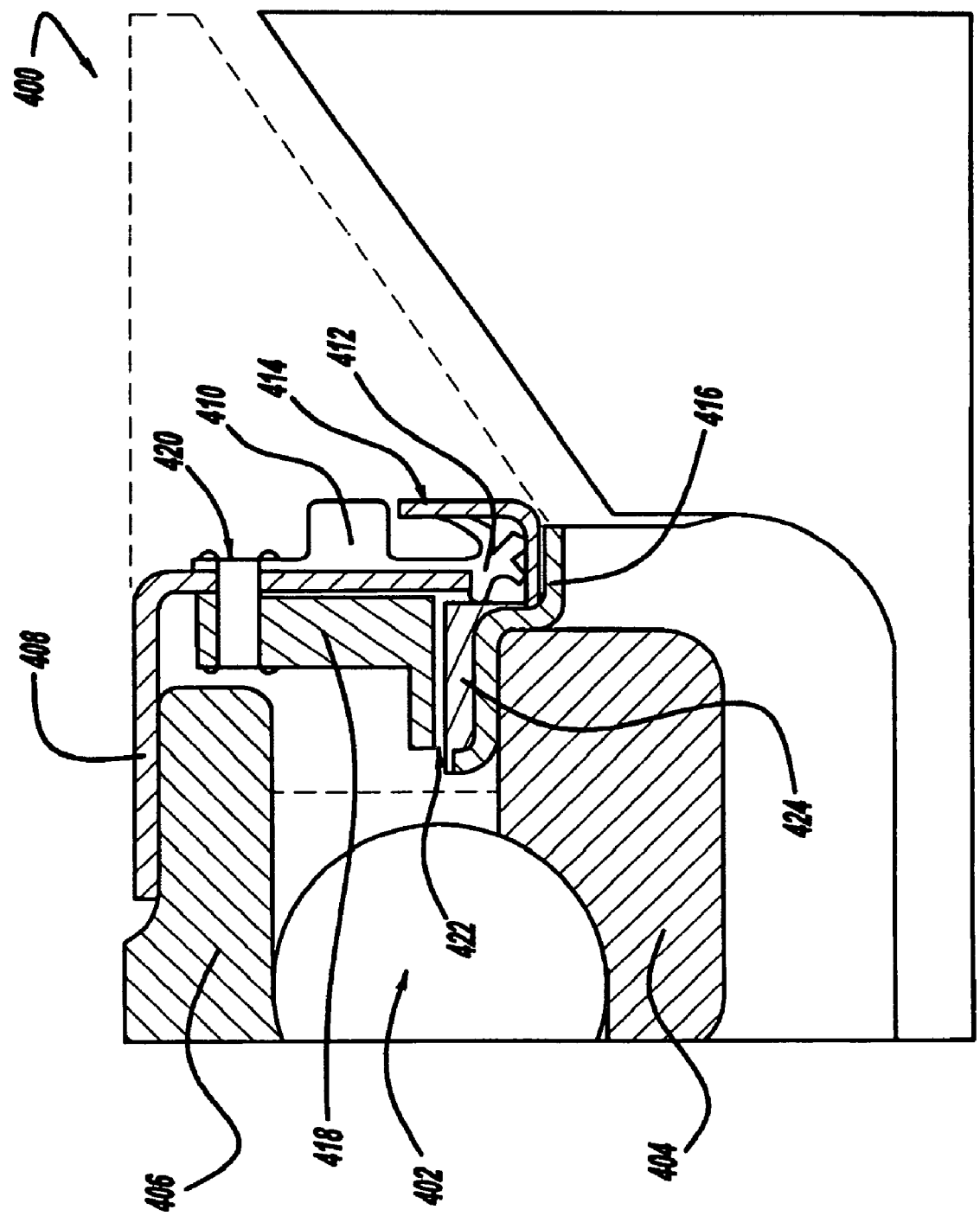
FIG. 4 shows a cross sectional view of assembly for using an encoder on a target wheel assembly to measure rotation of a wheel.

Turning now to the Figures (FIGs.), examples of magnetic encoder assemblies and sensor target assemblies that advantageously employ the compositional embodiments are illustrated in FIGS. 1 through 3. Encoder assembly 400, for use in a rotational speed-sensing device, is illustrated in FIG. 4.

FIG. 1 shows a view of an encoder target wheel assembly 100 with an encoder strip (continuous ring 108) in parallel mounting to rotational radius 106 of encoder target wheel 102. In this regard, encoder target wheel 102 is designed for rotation around rotational axis 104. Continuous ring 108 of cured magnetizable polymer is cured from an admixture of (a) a continuous phase of an elastomeric thermoplastic selected from the group consisting of polyester thermoplastic elastomer, polyamide thermoplastic elastomer, acrylic acid ester rubber/polyacrylate rubber thermoplastic vulcanizate, ethylene acrylic rubber thermoplastic vulcanizate, silicone-thermoplastic vulcanizate, thermoplastic polyurethane vulcanizate, thermoplastic polyurethane vulcanizate/polyamide thermoplastic elastomer (or combinations of these materials) and (b) a dispersed phase of magnetizable particulate dispersed in the continuous phase. A series of (first) magnetized portions (such as portion 110) are disposed in alternate sequence with a series of (second) portions (such as portion 112) in continuous ring 108. While continuous ring 108 is made of continuous cured magnetizable polymer as described above, each first magnetized portion (such as portion 110) has a (first) magnetic field strength that is differentiated from the (second) magnetic field strength of its adjacent second portion(s) (such as portion 112) by not less than about 200 Gauss when the first and second magnetic fields are measured across an air detection gap of about 1 mm. In this regard, the magnetic field strength of each first magnetized portion (such as portion 110) is a remanence from magnetization of that portion. The magnetic field strength of each second magnetized portion (such as portion 112) is, in one embodiment, a remanence from magnetization of that portion that is differentiated from the (first) magnetic field strength of its adjacent first portion(s) (such as portion 110) by not less than about 200 Gauss when the first and second magnetic fields are measured across an air detection gap of about 1 mm. However, in an alternative embodiment, the magnetic field strength of each second magnetized portion (such as portion 112) is essentially zero insofar as each second magnetized portion is an essentially non-magnetized portion; in this alternative embodiment, there is no remanence in the second portion insofar as no magnetic field was ever directly applied to the second portion.

Per the formulation of the admixture from which continuous ring 108 is cured, ring 108 has an elastic elongation property of not less than about 50 percent at break and a water swell property of not greater than about 10 percent.

FIG. 2 shows portion detail 200 for ring 108 in the encoder target wheel assembly 100 of FIG. 1. In this regard, ring 108, portion 110, and portion 112 are reprised for reference. Portion 202 is adjacent to portion 112 and to portion 204. Portions 110 and 202 are (first) magnetized portions disposed in alternate sequence with (second) portions 112 and 205 in continuous ring 108. Portions 110 and 202 have a remanence from magnetization that is differentiated from the magnetic field strength of portions 112 and 205 by not less than about 200 Gauss (with the note that the magnetic field strength of either or both of portions 112 and 205 has, in one embodiment, a value of zero) when the first and second magnetic fields are measured across an air detection gap of about 1 mm.

Respective to the amount of magnetizable particulate essentially continuously present throughout all of portions 110, 112, 202, and 204, it is to be appreciated that excessive particulate in the cured admixture of ring 108 either frustrates elongation by rendering cured ring 108 derived from the admixture too brittle or frustrates the ability to selectively magnetize portions 110 and 202 of into differentiated remanence from the magnetic fields of portions 112 and 204 by creating an effective continuum of magnetizable material where the individual particles cannot be independently magnetized. Sufficient particulate must be admixed into ring 108 so that the cured polymer of ring 108 provide sufficient remanence in portions 110 and 202, after a magnetizing field has been applied to portions 110 and 202, so that a reasonable sensor (positioned within a reasonable distance of ring 108 of, for example 1 mm) responds to the higher remanence when portions 110 and 202 pass by the sensor and also responds to the lower remanence (or lack of magnetic field in one embodiment) portions 112 and 204 such that the magnetic fields of portions 110 and 202 are sensed as differentiated from the magnetic fields of portions 112 and 204. One aspect of this utility is that there is a certain interplay between the amount of magnetizable particulate in the cured admixture of ring 108, the sensitivity of the sensor, the gap between the sensor, and the size (portional mass) of any of portions 110, 112, 202, and 204. In this regard, a cured block of the admixture of ring 108 with a length of about 1 centimeter, a width of about 1 centimeter, and a thickness of about 50 millimeters is useful for providing a sufficient volume of material to approximate a combination of portion 110 and portion 112, a combination of portion 112 and portion 202, or a combination of portion 202 and portion 204.

FIG. 3 shows a view of an encoder target wheel assembly 300 with an encoder strip 308 in perpendicular mounting to rotational radius 304 of target wheel 306. Strip 308 is mounted on the circumference the target wheel 306. In this regard, encoder target wheel 306 is designed for rotation around rotational axis 302. Continuous ring 308 of cured magnetizable polymer is cured from an admixture of (a) a continuous phase of an elastomeric thermoplastic selected from the group consisting of polyester thermoplastic elastomer, polyamide thermoplastic elastomer, acrylic acid ester rubber/polyacrylate rubber thermoplastic vulcanizate, ethylene acrylic rubber thermoplastic vulcanizate, silicone-thermoplastic vulcanizate, thermoplastic polyurethane vulcanizate, thermoplastic polyurethane vulcanizate/polyamide thermoplastic elastomer (or combinations of these materials) and (b) a dispersed phase of magnetizable particulate dispersed in the continuous phase. A series of (first) magnetized portions (such as portion 310) are disposed in alternate sequence with a series of (second) portions (such as portion 312) in continuous ring 308. While continuous ring 308 is made of continuous cured magnetizable polymer as described above, each first magnetized portion (such as portion 310) has a (first) magnetic field strength that is differentiated from the (second) magnetic field strength of its adjacent second portion(s) (such as portion 312) by not less than about 200 Gauss when the first and second magnetic fields are measured across an air detection gap of about 1 mm. As should be apparent, other details in assembly 300 significantly parallel and are readily apparent from a consideration of detailed considerations respective to FIGS. 1 and 2. In summary, FIG. 1 and FIG. 3 show two different assembly embodiments of encoder strips on target wheels.

The use of an encoder is more completely appreciated from FIG. 4 as it sets forth a cross sectional view of wheel speed sensing assembly 400 for using an encoder on a target wheel assembly to measure rotation of a wheel. Bearing 402 is positioned between upper bearing housing 406 and lower bearing housing 404, with bearing 402 capable of rotation between housing 406 and housing 404 so that a wheel connected to housing 404 rotates to convey a non-rotating assembly (such as a automotive chassis) connected to upper housing 406 and so that bearing 402 interfaces the weight of the non-rotating assembly to the wheel. In assembly 400, the wheel speed sensing system is efficiently integrated into the wheel's bearing system. In this regard, bearing housing 406 is connected to shaft seal housing 408 which provides shroud protection from dust, moisture, and debris to both bearing 402 and to the bearing rolling surfaces of housing 406 and housing 404; housing 408 also supports sensor 418 in a position to measure magnetic field flux from encoder 424. Encoder 424 is mounted upon bearing seal 416. Dust cover 414 is also compressively held tightly against bearing seal 416. Lip seal 410 is held tightly against the outboard surface of shaft seal housing 408 with grommet 420, and sensor 418 is also held tightly (in a position to measure magnetic field flux from encoder 424) against the inboard surface of shaft seal housing 408 with grommet 420. Lip seal 410 has a lower star portion 412 that has four flexible flanges ("lips") that appear in the cross-sectional view of FIG. 4 as a set of four prongs forming an irregular "star" in star portion 412. One of the lip seals (one of the prongs) of the "star" bears flexibly and slideably against the vertical portion (as depicted in FIG. 4) of dust cover 414, the next two clockwise-disposed lip seals of the "star" bear flexibly and slideably against two separate points of the lower horizontal portion (as depicted in FIG. 4) of dust cover 414, and the remaining fourth lip seal bears non-slideably against both the lower end of housing 408 and flexibly and slideably against an edge of encoder 424. Insofar as the four lips (prongs) of lip seal 410 have edges bearing on all inboard sides of a "U" formed by the vertical and horizontal portions of dust cover 412 and by an edge of encoder 424, a degree of labyrinthine seal protection is afforded to gap 422 (between sensor 418 and encoder 424), bearing 402, and the bearing rolling surfaces of housing 406 and housing 404 against dust, moisture, and debris. Gap 422 separates sensor 418 and encoder 424 with a space that is sufficiently small so that a series of (first) magnetized portions (such as portion 310 of FIG. 3) disposed in alternate sequence with a series of (second) portions (such as portion 312 in FIG. 3) in encoder 424 are differentially sensed as they pass sensor 418. As should be appreciated, the individual lips seals of star portion 412 abrade slightly in operation to ultimately slideably interface in very close tolerance to the non-flexible surfaces against which they slide.

When viewed in lateral cross section (not shown, but which should be apparent) perpendicular to the cross section of FIG. 4, encoder 424 provides a set of portions of sequentially disposed alternative magnetic fields arranged essentially according to the portions of encoder strip 308. In operation, encoder 424 rotates past sensor 418, and sensor 418 responds to the differentiated magnetic fields to generate a signal indicative of the rate of rotation of housing 404.

Encoder 424 is cured from a magnetizable admixture composition of magnetizable particulate admixed into an elastomeric thermoplastic of any of polyester thermoplastic elastomer, polyamide thermoplastic elastomer, acrylic acid ester rubber/polyacrylate rubber thermoplastic vulcanizate, ethylene acrylic rubber thermoplastic vulcanizate, silicone-thermoplastic vulcanizate, thermoplastic polyurethane vulcanizate, thermoplastic polyurethane vulcanizate/polyamide thermoplastic elastomer, or combinations of these as previously and further described herein. Prior to use, (first) portions of encoder 424 are magnetized to provide a remanence for sensing by sensor 418. These (first) portions having remanence are alternately disposed in with (second) portions of encoder 424 that either have no remanence or that have a remanence that is sensed by sensor 418 across gap 422 as magnetic fields of clearly differentiated remanence from the (first) magnetized portions as encoder 424 rotates past sensor 418.

The process of making some compositional embodiments, in which magnetic material is incorporated into a blend of thermoplastic material and elastomeric material prior to curing of the elastomer, provides both thermoplastic and vulcanizate phases in the blended and cured material as carriers for the magnetic materials. This allows for high volume matrix loadings of magnetic material even as desired material properties are achieved. In this regard, an advantage of the embodiments is that a material is provided that combines (a) mechanical and environmental durability advantages normally provided by thermoset-elastomer-based magnetic compounds under the range of environmental conditions needed for vehicle encoder applications with (b) ease of processing and manufacturing offered by engineered thermoplastics.

Turning now to embodiments for methods of making encoder target wheels, a target wheel is made in one embodiment by admixing an elastomeric thermoplastic with magnetizable particulate (and hydrophobic material as needed) as previously described herein, forming a continuous ring precursor of the admixture, curing the precursor to form a cured continuous ring, and magnetizing portions in the continuous ring in such a way that portions of un-magnetized (or differentially magnetized portions respective to the magnetized portions) admixture are provided. The encoder target ring is then attached to a support wheel of metal or other polymer for use in application.

In another embodiment for making encoder target wheels, the magnetizable admixture is formulated and then molded onto the support wheel prior to curing and magnetization. This provides benefits in fewer manufacturing steps and waste minimization respective to the embodiment where a cured ring is attached to a support wheel after curing. A further benefit in performance is realized in molding the magnetizable admixture onto the support wheel prior to curing and magnetization in elimination of any stress history in the cured ring between the time it is cured and fully installed into a target wheel assembly.

One method embodiment for making a magnetizable admixture compound embodiment is to admix the components of the appropriate magnetizable admixture with a conventional mixing system such as a batch polymer mixer, a roll mill, a continuous mixer, a single-screw mixing extruder, a twin-screw extruder mixing extruder, and the like until the magnetizable admixture has been fully admixed. Specific commercial batch polymer mixer systems in this regard include any of a Moriyama mixer, a Banbury mixer, and a Brabender mixer. In another embodiment the magnetizable admixture is intermixed at elevated temperature in the presence of an additive package in conventional mixing equipment as noted above. In one embodiment, a curing agent is admixed into the elastomer precursor solution shortly before molding. In another embodiment, the magnetizable admixture is molded into a desired article precursor and the molded precursor is cured with radiation to yield the desired article.

Curing processes for some embodiments having a curing agent admixed into the elastomer precursor proceed in a two step procedure. In a first step of this process, an initial cure is effected to the elastomer precursor to provide an initially cured elastomer precursor; the process then proceeds to a second step where a post cure is effected to the initially cured elastomer precursor to provide the desired cured elastomeric article. In the initial cure step, a predetermined temperature (or temperature profile) is effected for a predetermined duration (or according to a predetermined temperature-time functional profile for the duration of the defined time in the profile) to essentially cross-link and/or cure the elastomer precursor to provide desired chemical properties in the polymeric portion of the admixture. In the post cure step, a predetermined temperature (or temperature profile) effects for a predetermined duration (or according to a predetermined temperature-time functional profile for the duration of the defined time in the profile) to essentially remove or expel residual curing agent, monomer, and/or oligomer from the cured elastomer. The predetermined temperatures, temperature profiles, and/or predetermined durations are empirically established for the particular process and application of interest. Process embodiments for the magnetizable admixture embodiments cured with radiation (and not incorporating a curing agent) generally do not proceed through a post cure step.

In further detail for radiation cured embodiments, radiation curing of an elastomeric thermoplastic cross-links thermoplastic molecules and molecular portions of thermoplastic elastomer molecules even as the elastomer is further cured. In this regard, radiation curing (especially electron beam curing) of elastomeric thermoplastic magnetizable admixture encoder formulations is beneficial to the mechanical and water resistance properties of a derived encoder. The reason for this is that, while the melting point of crystals in a cross-linked thermoplastic is sustained in all crystalline portions of the thermoplastic, the dynamic modulus of cross-linked thermoplastic will be higher than that of the non-crosslinked thermoplastic due to crosslinkage between thermoplastic molecules in the amorphous phase of the thermoplastic. Further details in this regard are described in U.S. patent application Ser. No. 10/881,106 filed on Jun. 30, 2004 and entitled ELECTRON BEAM INTER-CURING OF PLASTIC AND ELASTOMER BLENDS incorporated by reference herein.

Electron beam processing is usually effected with an electron accelerator. Individual accelerators are usefully characterized by their energy, power, and type. Low-energy accelerators provide beam energies from about 150 keV to about 2.0 MeV. Medium-energy accelerators provide beam energies from about 2.5 to about 8.0 MeV. High-energy accelerators provide beam energies greater than about 9.0 MeV. Accelerator power is a product of electron energy and beam current. Such powers range from about 5 to about 300 kW. The main types of accelerators are: electrostatic direct-current (DC), electrodynamic DC, radiofrequency (RF) linear accelerators (LINACS), magnetic-induction LINACs, and continuous-wave (CW) machines.

In a preferred embodiment, the irradiative curing is achieved by irradiating the formed magnetizable admixture with electron beam radiation (preferably of from about 0.1 MeRAD to about 40 MeRAD and, more preferably, from about 5 MeRAD to about 20 MeRAD).

In one embodiment, the irradiative curing occurs within a cavity of a mold, where the housing of the mold enables transmission of an electron beam from an outside surface of the housing through the housing surface defining (at least in part) the cavity and thereby to the formed magnetizable admixture. The penetration depth of a particular electron beam depends upon the strength of the electron beam, the density of the housing materials, and the particular material used in the housing. In one embodiment, cross-linking and/or curing of the molded precursor for the encoder is achieved by irradiating the dispersed and continuous phases within a cavity of the previously described mold, where the housing of the mold enables transmission of an electron beam from an outside surface of the housing through a surface of the cavity and thereby to the dispersed and continuous phases. In this regard, the entire mold housing is, in one embodiment, made of a material (such as glass, steel, plastic, brass, or aluminum) that will transmit the radiation (preferably an electron beam). In an alternative embodiment, a portion of the mold housing is made of a material that will transmit the radiation. In yet another embodiment, a beam port (glass, steel, plastic, brass, or aluminum) is embedded into the mold housing and the beam port is made of a material that will transmit the radiation.

The radiation used for curing can be ultraviolet radiation, infrared radiation, ionizing radiation, electron beam radiation, x-ray radiation, an irradiating plasma, a discharging corona, or a combination of these.

In one embodiment for making an encoder target wheel, an adhesive is applied between the support wheel and the cured encoder ring. In another embodiment, an adhesive is applied to the support ring prior to the molding and curing of the magnetizable admixture. In yet another embodiment, the magnetizable admixture is applied to a channel in the support wheel without use of any adhesive.

The moldable elastomeric thermoplastic admixtures provide traditionally-identified benefits of reusable scrap, use of injection molding (as opposed to compression molding), lower capital cost, less tooling, and lower cycle times inherent in use of thermoplastics. Other potential benefits (with some further reference to FIG. 4) conceptually derive from potential component integration in, for example, combining any of components such as encoder 424, housing 404, and bearing seal 416 into fewer components, a single component, or into a multilayer component where differentiated material portions solidify into a molecularly-integrated multilayer structure. Many of these cost saving benefits further augment the plausibility of economically providing vehicle features such as four-wheel anti-skid braking as component integration and manufacturing cost savings from use of thermoplastic properties decrease the cost of traditionally-expensive assemblies. Another potential benefit of using elastomeric thermoplastic admixtures is in formulation with higher concentrations of iron than normally is achieved with rubber materials, providing thereby higher magnetic flux densities than previously available; such higher flux densities enable larger gaps and/or higher precision in rotational measurement systems.

EXAMPLES

Figure 5:
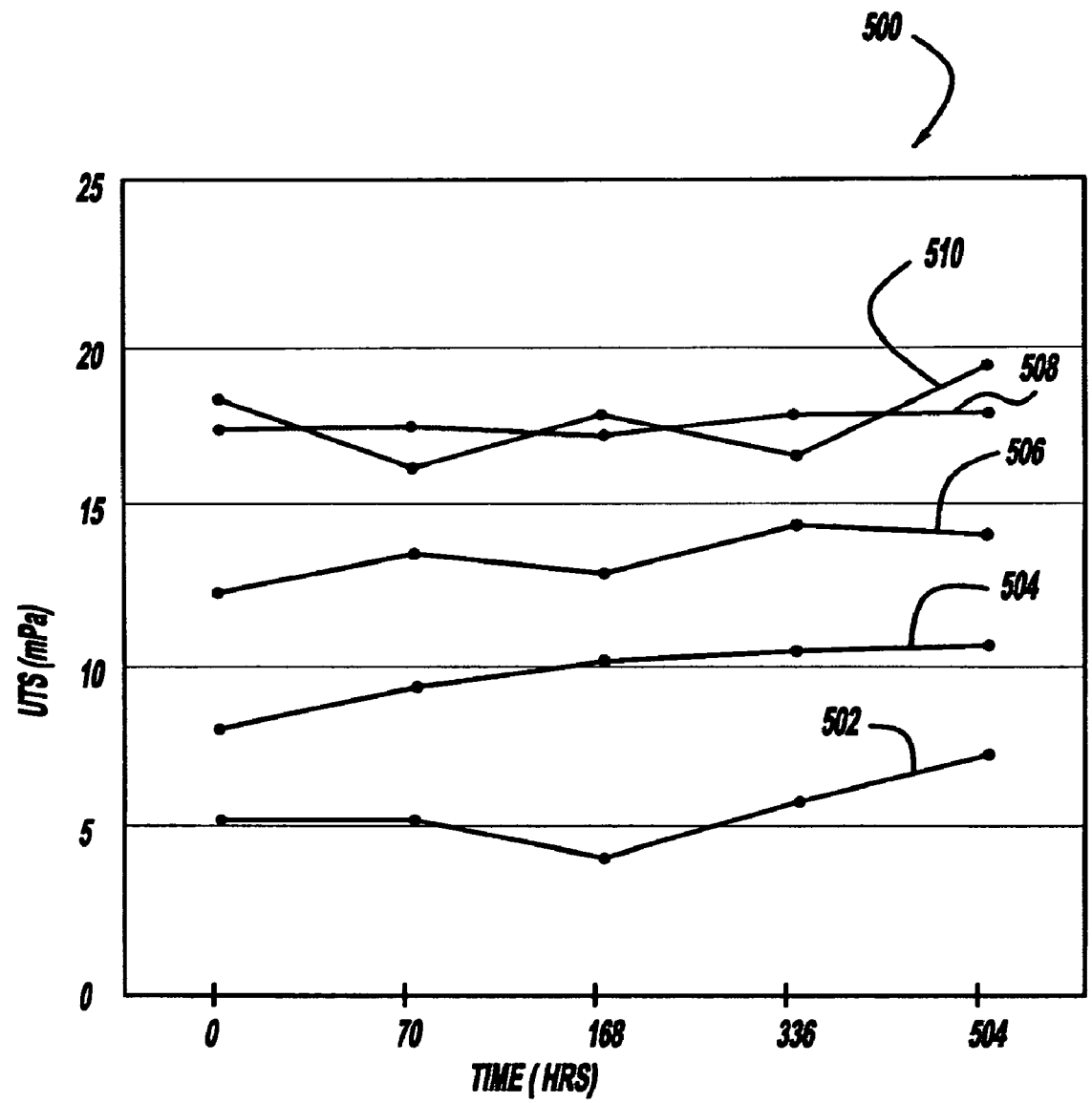
FIG. 5 presents comparative empirical results in tensile strength for magnetizable compositions for encoder use.

Example 1: Magnetizable admixtures are prepared according to Table 1 and heated at 125 degrees Celsius. Tensile strength is measured at 0, 70, 168, 336, and 504 hours of heat treatment. Results are indicated in FIG. 5 (see Table 1 for drawing element identifiers). The results clearly indicate that the tested magnetizable admixtures based upon either polyester thermoplastic elastomer or polyester thermoplastic elastomer/ethylene-vinyl acetate copolymer show superior tensile properties over the tested magnetizable admixture based upon nitrile butyl rubber (drawing element 502).

TABLE 1

Figure 6:
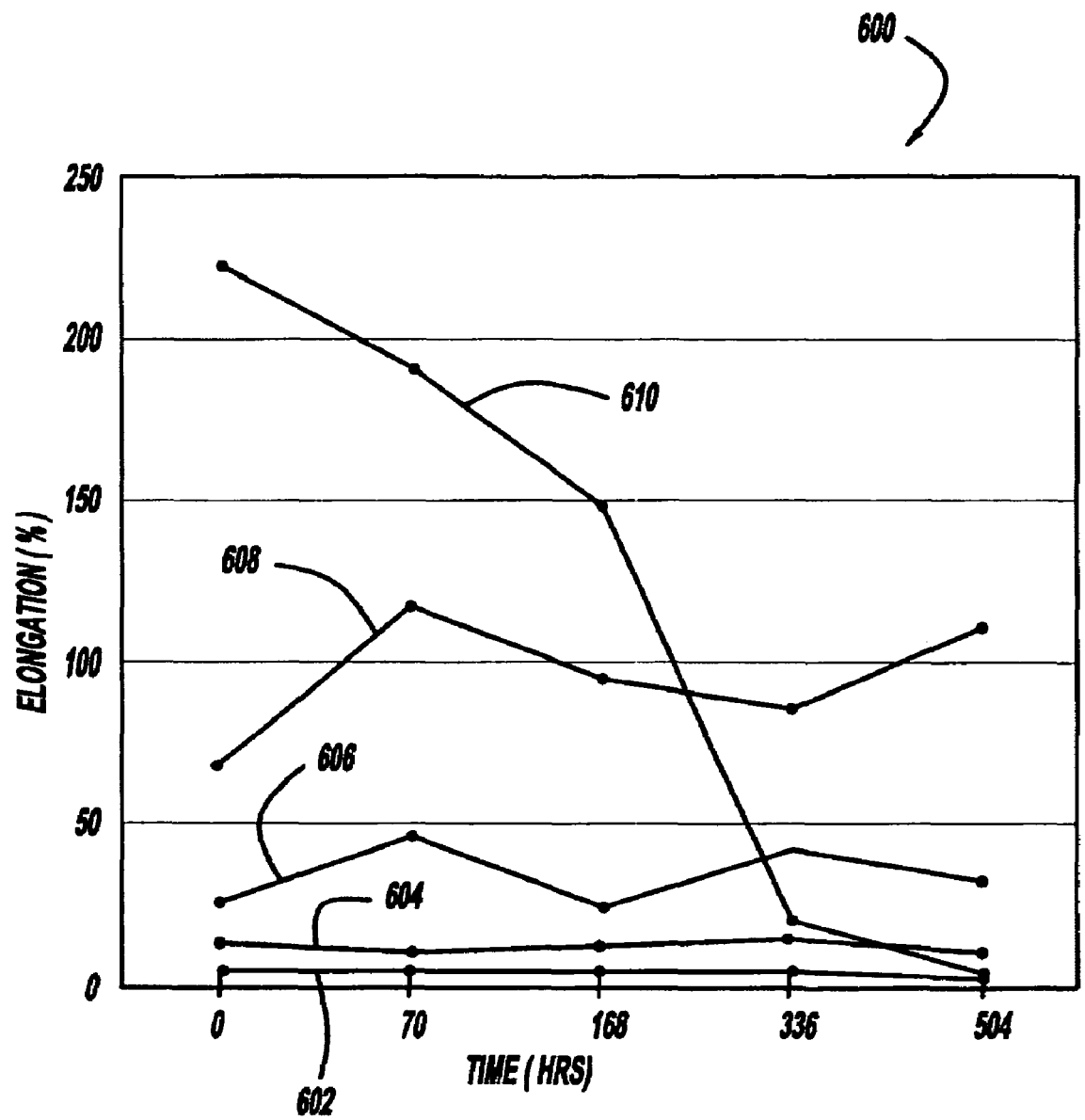
FIG. 6 presents comparative empirical results in elongation for magnetizable compositions for encoder use.

| Elastomeric base | Ethylene-vinyl acetate copolymer (Levaprene ™) weight percent | Ferrite volume percent | FIG. 5 Drawing element reference | FIG. 6 Drawing element reference |
|---|---|---|---|---|
| Nitrile butyl rubber | 0 | 40 | 502 | 610 |
| Polyester thermoplastic elastomer (Hytrel ™ 8139) | 0 | 47 | 508 | 604 |
| Polyester thermoplastic elastomer (Hytrel ™ 8139) | 0 | 56 | 510 | 602 |
| Polyester thermoplastic elastomer (Hytrel ™ 8139) | 5 | 47 | 506 | 606 |
| Polyester thermoplastic elastomer (Hytrel ™ 8139) | 10 | 40 | 504 | 608 |

Example 2: Magnetizable admixtures are prepared according to Table 1 and heated at 125 degrees Celsius. Elongation to break is measured at 0, 70, 168, 336, and 504 hours of heat treatment. Results are indicated in FIG. 6 (see Table 1 for drawing element identifiers). The results clearly indicate that the tested magnetizable admixtures based upon either polyester thermoplastic elastomer or polyester thermoplastic elastomer/ethylene-vinyl acetate copolymer show superior long-term elongation properties over the tested magnetizable admixture based upon nitrile butyl rubber (drawing element 610). However, it is also to be noted that initial elongation tests (at less than about 200 hours of heat treatment) indicate that the nitrile butyl rubber based magnetizable admixture has superior elongation properties to the magnetizable admixtures based upon polyester thermoplastic elastomer; it is only under extended testing that the relatively beneficial properties become apparent for the polyester thermoplastic elastomer based magnetizable admixture samples.

TABLE 2

| Elastomeric base | Ethylene-vinyl acetate copolymer (Levapren ™) weight percent | Ferrite volume percent | Change in volume volume percent |
|---|---|---|---|
| Nitrile butyl rubber | 0 | 40 | 13 |
| Polyester thermoplastic elastomer (Hytrel ™ 8139) | 0 | 47 | 11 |
| Polyester thermoplastic elastomer (Hytrel ™ 8139) | 0 | 56 | 15 |
| Polyester thermoplastic elastomer (Hytrel ™ 8139) | 5 | 47 | 6 |
| Polyester thermoplastic elastomer (Hytrel ™ 8139) | 10 | 40 | 1 |

Example 3: Magnetizable admixtures are prepared according to Examples 1 and 2 and a sample block of each admixture is immersed in water for 48 hours at 125 degrees Celsius. Volumetric change is measured for each sample block. Results are indicated in Table 2 for drawing element identifiers). The results clearly indicate that the tested magnetizable admixtures based upon either polyester thermoplastic elastomer or polyester thermoplastic elastomer/ethylene-vinyl acetate copolymer show superior long-term water swelling properties over the tested magnetizable admixture based upon nitrile butyl rubber.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. An encoder target wheel, comprising
    (a) a continuous ring of cured magnetizable polymer cured from an admixture comprising
        (i) a continuous phase of an elastomeric thermoplastic selected from the group consisting of polyester thermoplastic elastomer, polyamide thermoplastic elastomer, acrylic acid ester rubber/polyacrylate rubber thermoplastic vulcanizate, ethylene acrylic rubber thermoplastic vulcanizate, silicone-thermoplastic vulcanizate, thermoplastic polyurethane vulcanizate, thermoplastic polyurethane vulcanizate/polyamide thermoplastic elastomer, and combinations thereof, and
        (ii) a first dispersed phase of magnetizable particulate dispersed in said continuous phase, and
        (iii) a second dispersed phase of hydrophobic material dispersed in said continuous phase, the hydrophobic material comprising ethylene-vinyl acetate copolymer, and the hydrophobic material being present in the admixture in an amount not greater than about twice the weight of said elastomeric thermoplastic;
    (b) at least one first magnetized portion in said continuous ring, said first magnetized portion having a first magnetic field strength; and (c) at least one second portion in said continuous ring, said second portion having a second magnetic field strength differentiated from said first magnetic field strength by not less than about 200 Gauss when measured across an air detection gap of about 1 mm;

(d) wherein said admixture provides an elastic elongation property of not less than about 50 percent at break and a water swell property of not greater than about 10 percent in said encoder target wheel.

2. The encoder target wheel of claim 1, wherein said second dispersed phase of hydrophobic material comprises a combination of ethylene acrylic (monomer) rubber and ethylene-vinyl acetate copolymer.

3. The encoder target wheel of claim 1, wherein said continuous ring has a circumferential periphery and a plurality of said first and second portions are alternately disposed around said periphery.

4. The encoder target wheel of claim 1, wherein said magnetizable particulate comprises from about 80 weight percent to about 90 weight percent of said admixture and said elastomeric thermoplastic is said polyamide thermoplastic elastomer.

5. The encoder target wheel of claim 1, wherein said magnetizable particulate comprises from about 70 weight percent to about 90 weight percent of said admixture and said elastomeric thermoplastic is selected from the group consisting of acrylic acid ester rubber/polyacrylate rubber thermoplastic vulcanizate, ethylene acrylic rubber thermoplastic vulcanizate, silicone-thermoplastic vulcanizate, thermoplastic polyurethane vulcanizate, thermoplastic polyurethane vulcanizate/polyamide thermoplastic elastomer, and combinations thereof.

6. The encoder target wheel of claim 2, wherein said admixture comprises about 80 weight percent iron as said magnetizable particulate and said continuous phase comprises about 15 weight percent of said composition of polyester thermoplastic elastomer.

7. The encoder target wheel of claim 1, wherein said admixture comprises about 75 weight percent iron as said magnetizable particulate, said continuous phase comprises about 15 weight percent of said composition of polyester thermoplastic elastomer, and said second dispersed phase comprises about 10 weight percent of said composition of ethylene-vinyl acetate copolymer.

8. A method for making an encoder target wheel, comprising (a) admixing
(i) an elastomeric thermoplastic selected from the group consisting of polyester thermoplastic elastomer, polyamide thermoplastic elastomer, acrylic acid ester rubber/polyacrylate rubber thermoplastic vulcanizate, ethylene acrylic rubber thermoplastic vulcanizate, silicone-thermoplastic vulcanizate, thermoplastic polyurethane vulcanizate, thermoplastic polyurethane vulcanizate/polyamide thermoplastic elastomer, and combinations thereof and
(ii) magnetizable particulate, such that an admixture is formed of said particulate dispersed as a first dispersed phase in a continuous phase of said elastomeric thermoplastic, and
(ii) a second dispersed phase of hydrophobic material so that said second dispersed phase is dispersed in said continuous phase, the hydrophobic material comprising ethylene-vinyl acetate copolymer, and the hydrophobic material being present in the admixture in an amount not greater than about twice the weight of said elastomeric thermoplastic;

(b) forming a continuous ring precursor of said admixture;

(c) curing said precursor to form a cured continuous ring;

(d) magnetizing at least one first magnetized portion in said continuous ring such said first magnetized portion has a first magnetic field strength as a remanence; and (e) providing at least one second portion in said continuous ring, said second portion having a second magnetic field strength differentiated from said first magnetic field strength by not less than about 200 Gauss when measured across an air detection gap of about 1 mm;

(f) wherein said admixture provides an elastic elongation property of not less than about 50 percent at break and a water swell property of not greater than about 10 percent in said continuous ring.

9. The method of claim 8, wherein said second dispersed phase of hydrophobic material comprises a combination of ethylene acrylic (monomer) rubber and ethylene-vinyl acetate copolymer.

10. The method of claim 8, wherein said continuous ring has a circumferential periphery, a plurality of said first magnetic portions are magnetized around said periphery in said magnetizing, and a plurality of said second magnetic portions are provided around said periphery in said providing such that a plurality of said first and second portions are alternately disposed around said periphery.

11. The method of claim 8, wherein admixing admixes said magnetizable particulate as from about 80 weight percent to about 90 weight percent of said admixture and said elastomeric thermoplastic is selected from the group consisting of polyester thermoplastic elastomer, polyamide thermoplastic elastomer, and combinations thereof.

12. The method of claim 8, wherein said admixing admixes said magnetizable particulate as from about 70 weight percent to about 90 weight percent of said admixture and said elastomeric thermoplastic is selected from the group consisting of acrylic acid ester rubber/polyacrylate rubber thermoplastic vulcanizate, ethylene acrylic rubber thermoplastic vulcanizate, silicone-thermoplastic vulcanizate, thermoplastic polyurethane vulcanizate, thermoplastic polyurethane vulcanizate/polyamide thermoplastic elastomer, and combinations thereof.

13. The method of claim 9, wherein said admixing admixes about 80 weight percent iron as said magnetizable particulate and said elastomeric thermoplastic comprising about 15 weight percent of said composition of polyester thermoplastic elastomer.

14. The method of claim 8, wherein said admixing admixes about 75 weight percent iron as said magnetizable particulate and said elastomeric thermplastic comprising about 15 weight percent of said composition of polyester thermoplastic elastomer, and said second dispersed phase comprising about 10 weight percent of said composition of ethylene-vinyl acetate copolymer.

15. The composition of claim 8, wherein said curing of said precursor comprises curing of said precursor with radiation.

16. The composition of claim 8, wherein said radiation is selected from the group consisting of ultraviolet radiation, infrared radiation, ionizing radiation, electron beam radiation, x-ray radiation, an irradiating plasma, a discharging corona, and a combination of these.

17. An encoder target wheel made by a process according to the method of claim 8.

* * * * *

UNITED STATES PATENT AND TRADEMARK OFFICE
CERTIFICATE OF CORRECTION

| | |
|---|---|
| PATENT NO. | : 7,339,448 B2 |
| APPLICATION NO. | : 11/011900 |
| DATED | : March 4, 2008 |
| INVENTOR(S) | : Park et al. |

It is certified that error appears in the above-identified patent and that said Letters Patent is hereby corrected as shown below:

Col. 17, line 56 (Claim 8): "thereof and" should be -- thereof; and --

Col. 17, line 61 (Claim 8): "(ii)" should be -- (iii) --

Col. 18, line 4 (Claim 8): "such said" should be -- such that said --

Col. 18, line 50 (Claim 14): "thermplastic" should be -- thermoplastic --

Signed and Sealed this

Sixteenth Day of March, 2010

David J. Kappos
*Director of the United States Patent and Trademark Office*